(12) United States Patent
Shibuya

(10) Patent No.: US 6,564,576 B2
(45) Date of Patent: May 20, 2003

(54) MOTOR-DRIVEN COMPRESSORS

(75) Inventor: Makoto Shibuya, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/012,329

(22) Filed: Dec. 12, 2001

(65) Prior Publication Data
US 2002/0073729 A1 Jun. 20, 2002

(30) Foreign Application Priority Data
Dec. 18, 2000 (JP) ........................................ 2000-383763

(51) Int. Cl.⁷ ............................ F25D 23/12; F25B 31/00
(52) U.S. Cl. ......................................... 62/505; 62/259.2
(58) Field of Search .............................. 62/505, 259.2; 417/366, 902; 361/688, 274.1, 274.2, 274.3, 676

(56) References Cited

U.S. PATENT DOCUMENTS

| 3,913,349 | A |   | 10/1975 | Moody, Jr. et al. |
| 4,319,171 | A |   | 3/1982  | Motoori |
| 4,633,151 | A |   | 12/1986 | Crook |
| 4,808,078 | A |   | 2/1989  | Havens et al. |
| 4,903,497 | A |   | 2/1990  | Zimmern et al. |
| 4,906,884 | A |   | 3/1990  | Teshigawara |
| 4,936,112 | A |   | 6/1990  | Miller |
| 5,006,045 | A |   | 4/1991  | Shimoda et al. |
| 5,103,652 | A |   | 4/1992  | Mizuno et al. |
| 5,329,788 | A |   | 7/1994  | Caillat et al. |
| 5,350,039 | A |   | 9/1994  | Voss et al. |
| 5,436,547 | A |   | 7/1995  | Nagai et al. |
| 5,640,073 | A |   | 6/1997  | Ikeda et al. |
| 5,782,610 | A |   | 7/1998  | Ikeda |
| 5,857,348 | A |   | 1/1999  | Conry |
| 6,086,335 | A |   | 7/2000  | Bass et al. |
| 6,112,535 | A |   | 9/2000  | Hollenbeck |
| 6,202,428 | B1 |  | 3/2001  | Katayama et al. |
| 6,321,563 | B1 |  | 11/2001 | Ikeda et al. |
| 6,375,439 | B1 | * | 4/2002 | Missio .................... 417/410.1 |
| 2002/0025265 | A1 | * | 2/2002 | Ikeda ....................... 417/410.1 |
| 2002/0039532 | A1 | * | 4/2002 | Saito et al. ................. 417/310 |
| 2002/0062655 | A1 | * | 5/2002 | Bellet ........................ 62/259.2 |
| 2002/0062656 | A1 | * | 5/2002 | Suitou et al. .............. 62/259.2 |

* cited by examiner

Primary Examiner—Denise L. Esquivel
Assistant Examiner—Marc Norman
(74) Attorney, Agent, or Firm—Baker Botts L.L.P.

(57) ABSTRACT

A motor-driven compressor according to the present invention is formed with a housing that contains a compression portion and a motor for compressing refrigerant. The compressor housing further is provided with a suction housing for introducing the refrigerant. A capacitor is provided for smoothing a current that is supplied from a power source to the motor. The capacitor is in contact with the suction housing. In such motor-driven compressors, because the capacitor is in contact with the suction housing, heat transfer from the capacitor to the housing may effectively be facilitated. In further embodiments of the present invention, the capacitors may be disposed on various portions of the suction housing and in various orientations relative to an axial direction of the motor-driven compressor. These selected orientations reduce the dimensions of the motor-driven compressor.

6 Claims, 4 Drawing Sheets

MOTOR-DRIVEN COMPRESSORS

BACKGROUND OF THE INVENTION

1. Field of the Invention

The present invention relates to motor-driven compressors used in vehicle air conditioning systems to compress refrigerant, and more particularly, to motor-driven compressors having a motor driven by a power supply, such as a battery.

2. Description of Related Art

Motor-driven compressors are known in the art. For example, Japanese Unexamined Patent Publication No. 2000-291557 describes a motor-driven compressor formed with a housing containing a compression portion and a motor for driving the compression portion to compress refrigerant. In this known motor-driven compressor, a drive circuit for controlling the operation of the motor is disposed adjacent to a suction port for refrigerant gas. In the drive circuit, a capacitor is included as one of the components of an inverter. The capacitor is provided to smooth, i.e., to reduce or eliminate, the alternating current component or ripple current of current supplied from a direct-current (DC) power supply to the motor. According to this known motor-driven compressor, a cooling device, such as a radiator, fan, water cooling radiator or water circulating pipes, is no longer necessary for cooling the drive circuit.

In the known motor-driven compressor, however, a high-frequency, ripple current flows through the capacitor, thereby increasing the heat generated in the capacitor. Moreover, the increase in heat generated in the capacitor by the ripple current may require an increase in the size of a capacitor used to handle the increased heat generated by such high-frequency, ripple current. The increased size of the capacitor may increase the cost of the capacitor. In addition, because the drive circuit may be manufactured separately and attached to the motor-driven compressor, the capacitor may extend from a housing of the motor-driven compressor. As a result, the size of the known motor-driven compressor with a built-in inverter may increase due to any increase in the size of the capacitor.

SUMMARY OF THE INVENTION

A need has arisen in motor-driven compressors that use capacitors for smoothing current supplied to the motor, to reduce the overall size of the motors. Further needs have arisen to reduce the manufacturing cost of such motor-driven compressors and to facilitate heat transfer from the capacitors.

In an embodiment of this invention, a motor-driven compressor comprises a housing containing a compression portion and a motor for driving the compression portion to compress refrigerant. The compressor housing further comprises a suction housing for introducing the refrigerant. A capacitor is provided for smoothing current supplied from a power source to the motor. The capacitor is disposed in contact with the suction housing. In further embodiments of this invention, the capacitor may be disposed on various portions of the suction housing and in one of a plurality of orientations relative to an axial direction of the motor-driven compressor. The selected orientations facilitate heat transfer and reduce the overall dimensions of the motor-driven compressor.

Other objects, features, and advantages of embodiments of this invention will be apparent to, and understood by, persons of ordinary skill in the art from the following detailed description of the invention and the accompanying drawings.

BRIEF DESCRIPTION OF DRAWINGS

The present invention may be more readily understood with reference to the following drawings.

DETAILED DESCRIPTION OF PREFERRED EMBODIMENTS

Figure 1:
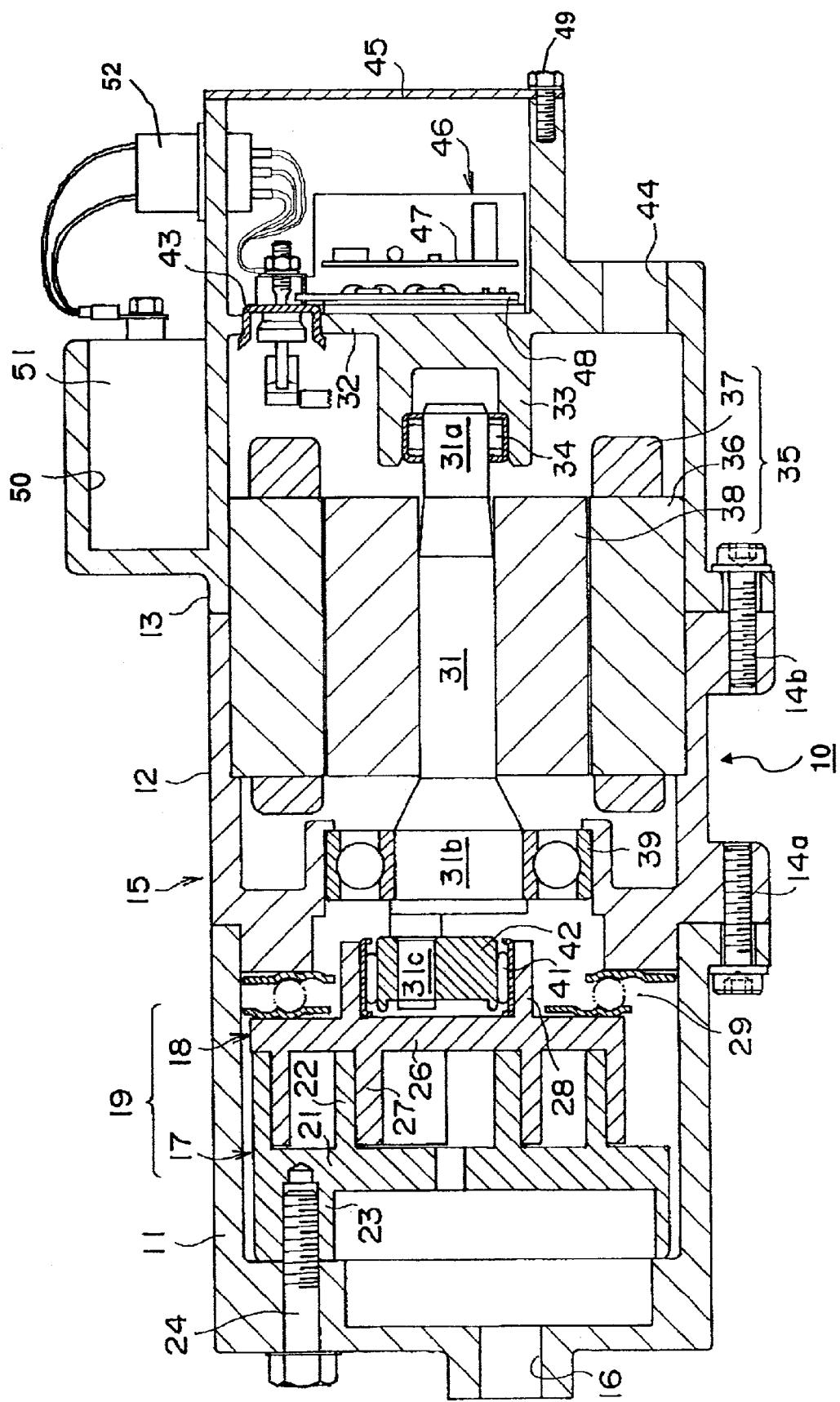
FIG. 1 is a vertical, cross-sectional view of a motor-driven compressor, according to a first embodiment of the present invention.

Referring to FIG. 1, a motor-driven compressor according to a first embodiment of the present invention is shown. A motor-driven compressor 10 has a discharge housing 11, an intermediate housing 12, and a suction housing 13. Housings 11, 12, and 13 may be made from a metal or a metal alloy, including aluminum or an aluminum alloy. Intermediate housing 12 and discharge housing 11 are connected by a plurality of fasteners, such as bolts 14a. Suction housing 13 and intermediate housing 12 are connected by a plurality of fasteners, such as bolts 14b. Thus, a common housing 15 comprises discharge housing 11, intermediate housing 12, and suction housing 13. Discharge housing 11 has a discharge port 16 formed through an axial end surface. The compression portion comprises a fixed scroll member 17 and an orbiting scroll member 18. Fixed scroll member 17 and orbiting scroll member 18 are provided in discharge housing 11, so that both scroll members 17 and 18 interfit to form a refrigerant compression area 19.

Fixed scroll member 17 includes an end plate 21, a spiral element 22 provided on one surface of end plate 21, and a securing portion 23 formed on another surface of end plate 21. Securing portion 23 is fixed to an inner surface of a side wall of discharge housing 11 by a plurality of bolts 24. Orbiting scroll member 18 includes an end plate 26, a spiral element 27 provided on one surface of end plate 26, and a cylindrical boss portion 28 projecting from another surface of end plate 26. A rotation prevention mechanism 29 comprises a plurality of balls, each of which travels in a pair of rolling ball grooves formed in opposing ring-shaped races and is provided between a surface of end plate 26 and an axial end surface of intermediate housing 12. Rotation prevention mechanism 29 prevents the rotation of orbiting scroll member 18, but allows an orbital motion of orbiting scroll member 18 at a predetermined orbital radius with respect to a center of fixed scroll member 17. Alternatively, an Oldham coupling may be used as the rotation prevention mechanism.

As shown in FIG. 1, a drive shaft 31 is disposed within intermediate housing 12 and suction housing 13. One end portion of drive shaft 31 has a first portion 31a with a diameter that is less than a diameter of a central portion of drive shaft 31. Another end portion of drive shaft 31 has a second portion 31b with a diameter that is greater than the diameter of the central portion of drive shaft 31. Suction housing 13 has a partition wall 32 at its axial middle portion. Partition wall 32 extends across a width of suction housing 13. A cylindrical projecting portion 33 is provided on one surface of partition wall 32 to extend toward the compression area 19. Reduced diameter first portion 31a is rotatably supported by projecting portion 33 via a bearing 34. Increased diameter second portion 31b is rotatably supported by intermediate housing 12 via a bearing 39. An eccentric pin 31c projects from an end surface of increased diameter second portion 31b in a direction along an axis of drive shaft 31. Eccentric pin 31c is inserted into an eccentric bushing 42, which is rotatably supported by boss portion 28 of orbiting scroll member 18 via a bearing 41.

A motor 35 is disposed within intermediate housing 12 and suction housing 13. Motor 35 comprises a stator 36, a coil 37, and a rotor 38. Stator 36 is fixed on an inner surface of intermediate housing 12 and suction housing 13. Coil 37 is provided around stator 36. Rotor 38 is fixed on drive shaft 31.

In motor-driven compressor 10, a plurality of sealed terminals 43 are provided on an upper or left portion of partition wall 32 in suction housing 13, as depicted in FIG. 1. A refrigerant suction port 44 is provided through an outer surface of a side wall of suction housing 13. Suction housing 13 also includes an opening, which is located at an end of suction housing 13 away from intermediate housing 12. The opening of suction housing 13 is covered by a lid 45. Lid 45 is fixed to an axial end of suction housing 13 via a plurality of fasteners, such as bolts 49. Lid 45 may be formed from a metal or a metal alloy, including aluminum or an aluminum alloy, as is used to form suction housing 13. In addition, lid 45 may be formed from materials such as iron or magnetic materials. Preferably, lid 45 is made from a material capable of providing shielding against electromagnetic radiation. In addition, lid 45 protects electrical circuits provided within motor-driven compressor 10 from damage due to water and foreign materials.

A drive circuit 46 includes a control circuit 47 and an inverter 48. Drive circuit 46 is provided on, and fixed to, a surface of partition wall 32 within suction housing 13. Inverter 48 is connected to output terminals 43. A capacitor chamber 50 for receiving a capacitor 51 is provided on an upper exterior wall of suction housing 13. Capacitor 51, which smoothes current sent or supplied to motor 35, is inserted into capacitor chamber 50. Thus, capacitor 51 is in contact, e.g., direct contact, with suction housing 13. Capacitor 51 is connected to an external power source (not shown), such as a battery mounted on the vehicle, via a connector 52, which is provided on an upper wall of suction housing 13. Electric power is supplied to drive circuit 46 and other electrical components, via connector 52. In this embodiment of motor-driven compressor 10, because capacitor 51 is in contact with suction housing 13, heat transfer from capacitor 51 to suction housing 13 may effectively be facilitated.

Figure 2:
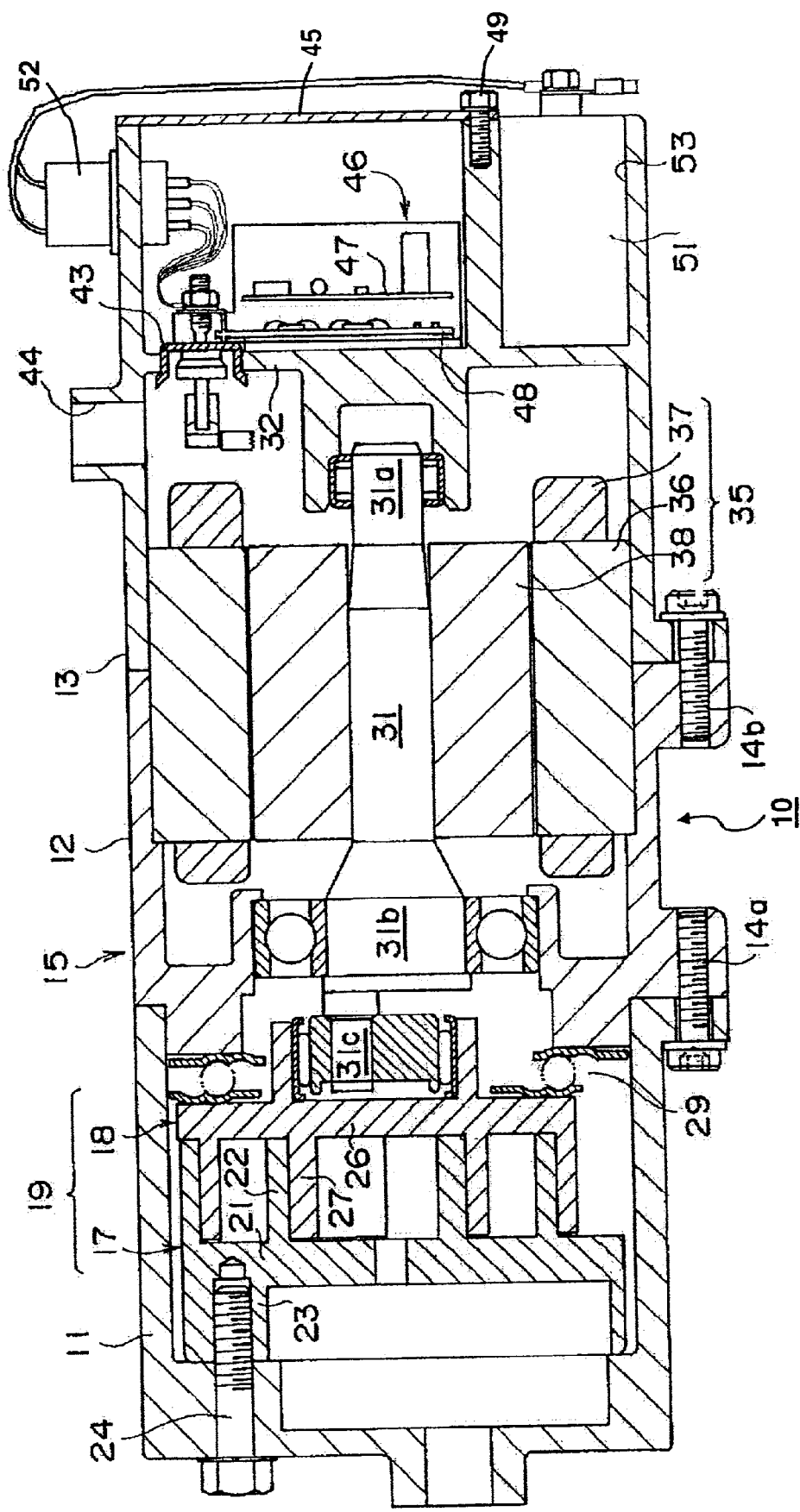
FIG. 2 is a vertical, cross-sectional view of a motor-driven compressor, according to a second embodiment of the present invention.

Referring to FIG. 2, a motor-driven compressor according to a second embodiment of the present invention is shown. In this embodiment, parts that are the same or substantially similar to those disclosed in the first embodiment of the motor compressor are designated by like numerals, and explanations thereof are omitted hereinafter. In this embodiment of motor-driven compressor 10, a capacitor chamber 53 for receiving a capacitor 51 is formed at a lower portion of suction housing 13, as depicted in FIG. 2, and opens along an axial direction of motor-driven compressor 10. Capacitor 51 is inserted into capacitor chamber 53 along an axial direction of motor-driven compressor 10. Thus, capacitor 51 is in contact, e.g., direct contact, with suction housing 13. As a result, because capacitor 51 is in contact with suction housing 13, heat transfer from capacitor 51 to suction housing 13 may effectively be facilitated. Moreover, because capacitor 51 is inserted into capacitor chamber 53 formed in an interior portion of suction housing 13, a reduction of the dimensions of motor-driven compressor 10 may be achieved. Consequently, the manufacturing cost of motor-driven compressor 10 may be reduced, as well.

Figure 3:
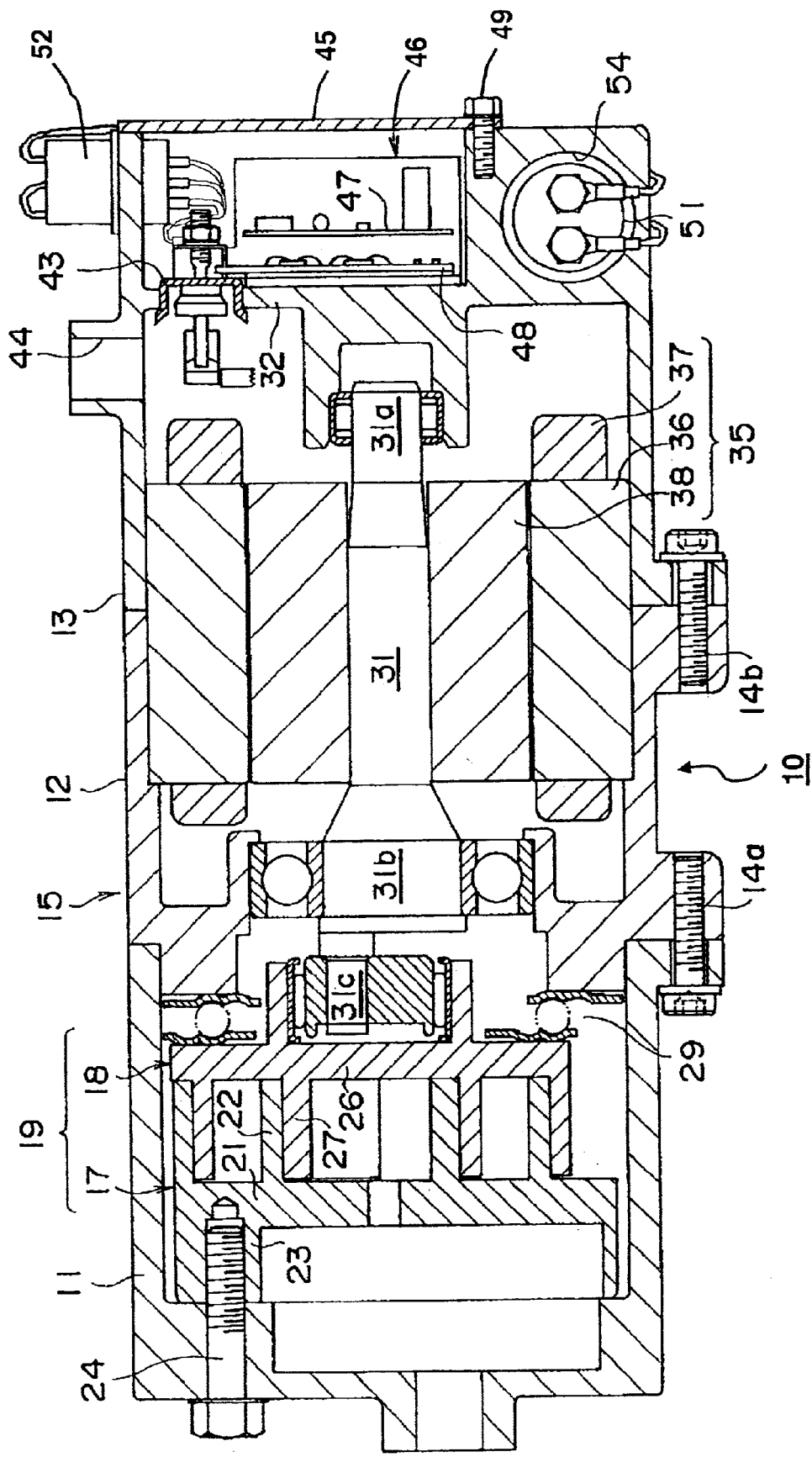
FIG. 3 is a vertical, cross-sectional view of a motor-driven compressor, according to a third embodiment of the present invention.

Referring to FIG. 3, a motor-driven compressor according to a third embodiment of the present invention is shown. In this embodiment of the present invention, parts that are the same or substantially similar as those disclosed in the first embodiment of the motor-driven compressor are designated by like numerals and explanations thereof are omitted hereinafter. In this embodiment of motor-driven compressor 10, a capacitor chamber 54 for receiving a capacitor 51 is formed at a lower portion of suction housing 13, as depicted in FIG. 3, and opens in a direction substantially transverse to an axial direction of motor-driven compressor 10. Capacitor 51 is inserted into capacitor chamber 54. Thus, capacitor 51 is in contact, e.g., direct contact, with suction housing 13. As a result, because capacitor 51 is in contact with suction housing 13, heat transfer from capacitor 51 to suction housing 13 may effectively be facilitated. Moreover, because capacitor 51 is inserted into capacitor chamber 54 formed in suction housing 13, a reduction of the dimensions of motor-driven compressor 10 may be achieved. Consequently, the manufacturing cost of motor-driven compressor 10 may be reduced, as well.

Figure 4:
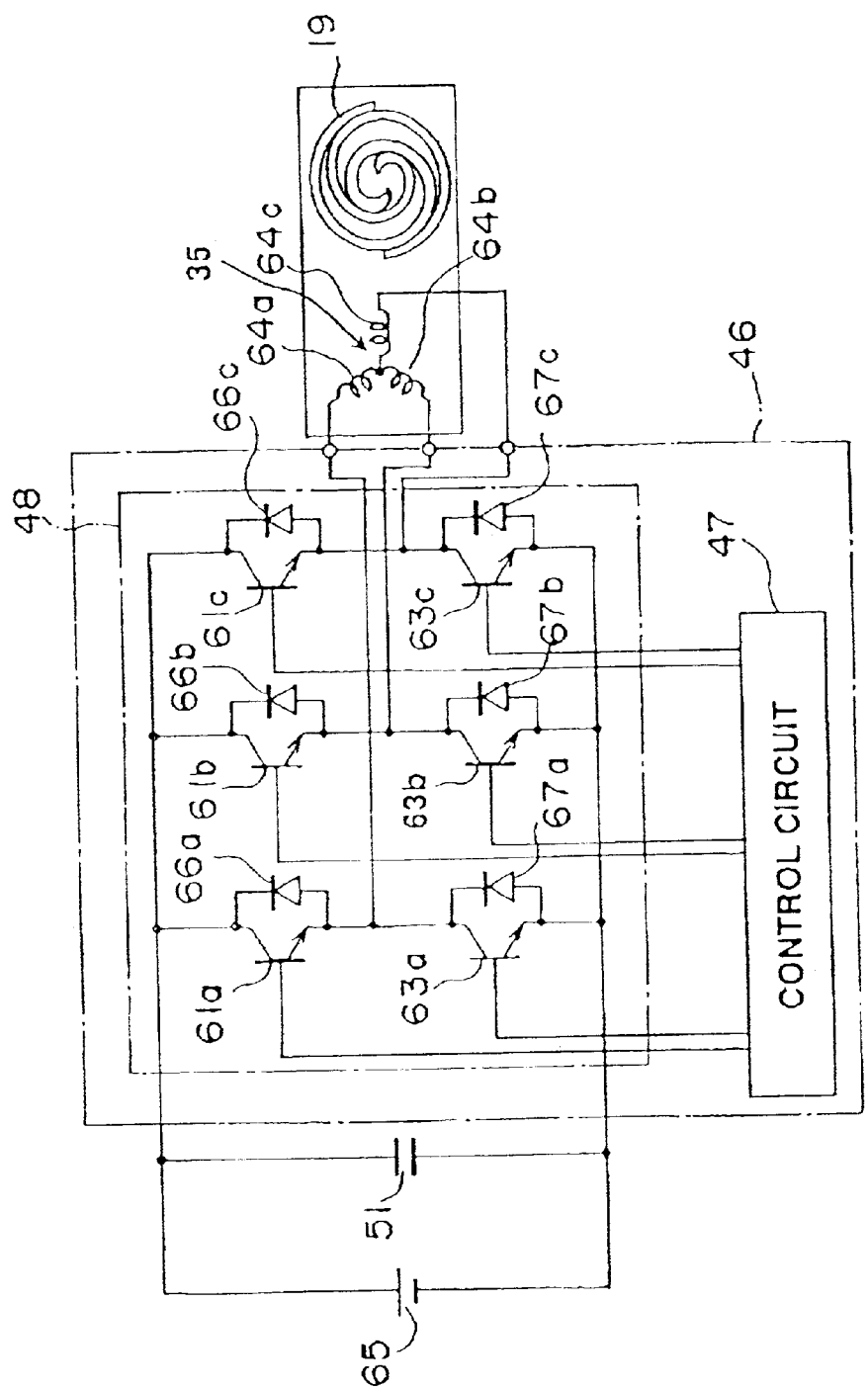
FIG. 4 is a circuit diagram of a drive circuit for use in the motor-driven compressors depicted in FIGS. 1–3.

FIG. 4 depicts the circuit structure of drive circuit 46 of motor-driven compressor 10. Drive circuit 46 has a circuit structure similar to that disclosed in Japanese Unexamined Patent Publication No. H9-163791. Motor 35 may be a three-phase current motor and may comprise three coils 64a, 64b, and 64c coupled to one another. Motor 35 may be, for example, a brushless motor. Motor 35 also may include a rotor 38 comprised of a permanent magnet and a stator 36 having coils 64a, 64b, and 64c. In inverter 48, a plurality of transistors 61a, 61b, 61c, 63a, 63b, and 63c are provided. Transistors 61a, 61b, 61c, 63a, 63b, and 63c are coupled to control circuit 47. Control circuit 47 controls a switching operation of transistors 61a, 61b, 61c, 63a, 63b, and 63c.

In inverter 48, transistors 61a, 61b, 61c, 63a, 63b, and 63c are divided into positive-side transistors 61a, 61b, and 61c, and negative-side transistors 63a, 63b, and 63c. Positive-side transistors 61a, 61b, and 61c form upper arms, while negative-side transistors 63a, 63b, and 63c form lower arms in inverter 48. Both positive-side transistors 61a, 61b, and 61c and negative-side transistors 63a, 63b, and 63c are coupled to an external DC power source 65, which may comprise a battery, via a capacitor 51.

Further, diodes 66a, 66b, 66c, 67a, 67b, and 67c are coupled between the emitters and the collectors of transistors 61a, 61b, 61c, 63a, 63b, and 63c, respectively. Diodes 66a, 66b, 66c, 67a, 67b, and 67c return a counter-current generated by three-phase motor 35 to DC power source 65. Specifically, when the operation of motor 35 is stopped, or when the chopping (i.e., cutting a peak or a bottom of a wave, or both) of the pulse code modulation is deactivated, diodes 66a, 66b, 66c, 67a, 67b, and 67c cause a counter-electromotive force, generated from coils 64a, 64b, and 64c of motor 35, to be applied to DC power source 65. Usually, the internal capacitance of each of diodes 66a, 66b, 66c, 67a, 67b, and 67c is set at the same internal capacitance as each of corresponding transistors 61a, 61b, 61c, 63a, 63b, and 63c. Moreover, diodes 66a, 66b, 66c, 67a, 67b, and 67c protect transistors 61a, 61b, 61c, 63a, 63b, and 63c from damage due to counter-electromotive forces.

Moreover, each of the base sides of transistors 61a, 61b, 61c, 63a, 63b, and 63c is coupled to control circuit 47. The collector sides of upper arms (i.e., transistors 61a, 61b, and 61c) and the emitter sides of lower arms (i.e., transistors 63a, 63b, and 63c) are coupled to DC power source 65 for supplying power to the transistors. Capacitor 51 is coupled between the poles of DC power source 65 for smoothing the current supplied to motor 35.

In operation, control circuit 47 sends control signals to transistors 61a, 61b, 61c, 63a, 63b, and 63c. When motor-driven compressor 10 is to be stopped, the switching operations of transistors 61a, 61b, 61c, 63a, 63b, and 63c first are briefly deactivated. After that, while the upper arms (i.e., transistors 61a, 61b, and 61c) are maintained in a deactivated condition, the lower arms (i.e., transistors 63a, 63b, and 63c) are activated for a time period that is not less than a predetermined period. By this procedure, operation of motor-driven compressor 10 is stopped completely and smoothly.

In inverter 48, when motor-driven compressor 10 is operated under normal operating conditions, the transistors 61a, 61b, 61c, 63a, 63b, and 63c receive control signals from control circuit 47, and inverter 48 converts the DC current supplied by DC power source 65 into a three-phase current at a suitable phase differentiation for operating motor 35. The three-phase current is supplied to motor 35.

As described above, in a motor-driven compressor according to various embodiments of the present invention, because a capacitor is in contact with a suction housing, heat transfer from the capacitor may effectively be facilitated. Moreover, the overall dimensions of the motor-driven compressor may be reduced. In addition, the manufacturing cost of the motor-driven compressor may be reduced.

Although the present invention has been described in connection with preferred embodiments, the invention is not limited thereto. It will be understood by those skilled in the art that other embodiments, variations, and modifications of the invention will be apparent to those skilled in the art from a consideration of this specification or practice of the invention disclosed herein, and may be made within the scope and spirit of this invention, as defined by the following claims.

What is claimed is:

1. A motor-driven compressor comprising:
   a housing comprising a suction housing for introducing refrigerant, said housing containing a compression portion and a motor for driving said compression portion to compress refrigerant; and
   a capacitor for smoothing a current supplied to operate said motor, wherein said capacitor is in contact with said suction housing, a receiving chamber is formed in said suction housing, and said capacitor is inserted into said receiving chamber.

2. A motor-driven compressor comprising:
   a housing for a compression portion and a motor; and
   a capacitor, wherein said capacitor is in direct contact with said housing and is disposed in one of a plurality of orientations relative to an axial direction of said housing.

3. The motor-driven compressor of claim 2, wherein, said capacitor is disposed on an exterior portion of said housing.

4. The motor-driven compressor of claim 2, wherein, said capacitor is disposed on a portion of said housing generally opposite to a refrigerant suction port of said housing.

5. The motor-driven compressor of claim 2, wherein, said capacitor is disposed on an interior portion of said housing.

6. The motor-driven compressor of claim 2, wherein, said housing includes a suction housing for introducing a refrigerant.

* * * * *

UNITED STATES PATENT AND TRADEMARK OFFICE
CERTIFICATE OF CORRECTION

PATENT NO. : 6,564,576 B2
DATED : May 20, 2003
INVENTOR(S) : Makoto Shibuya

It is certified that error appears in the above-identified patent and that said Letters Patent is hereby corrected as shown below:

<u>Title page,</u>
Item [56], References Cited, U.S. PATENT DOCUMENTS, delete "3,913,349" and insert -- 3,913,346 --.

Signed and Sealed this

Sixth Day of April, 2004

JON W. DUDAS
*Acting Director of the United States Patent and Trademark Office*